April 2, 1940.  J. TOGGENBURGER  2,195,606
COMBINED TYPEWRITING AND COMPUTING MACHINE
Filed Oct. 25, 1933  6 Sheets-Sheet 2

INVENTOR:
John Toggenburger
BY O C Stickney
ATTORNEY.

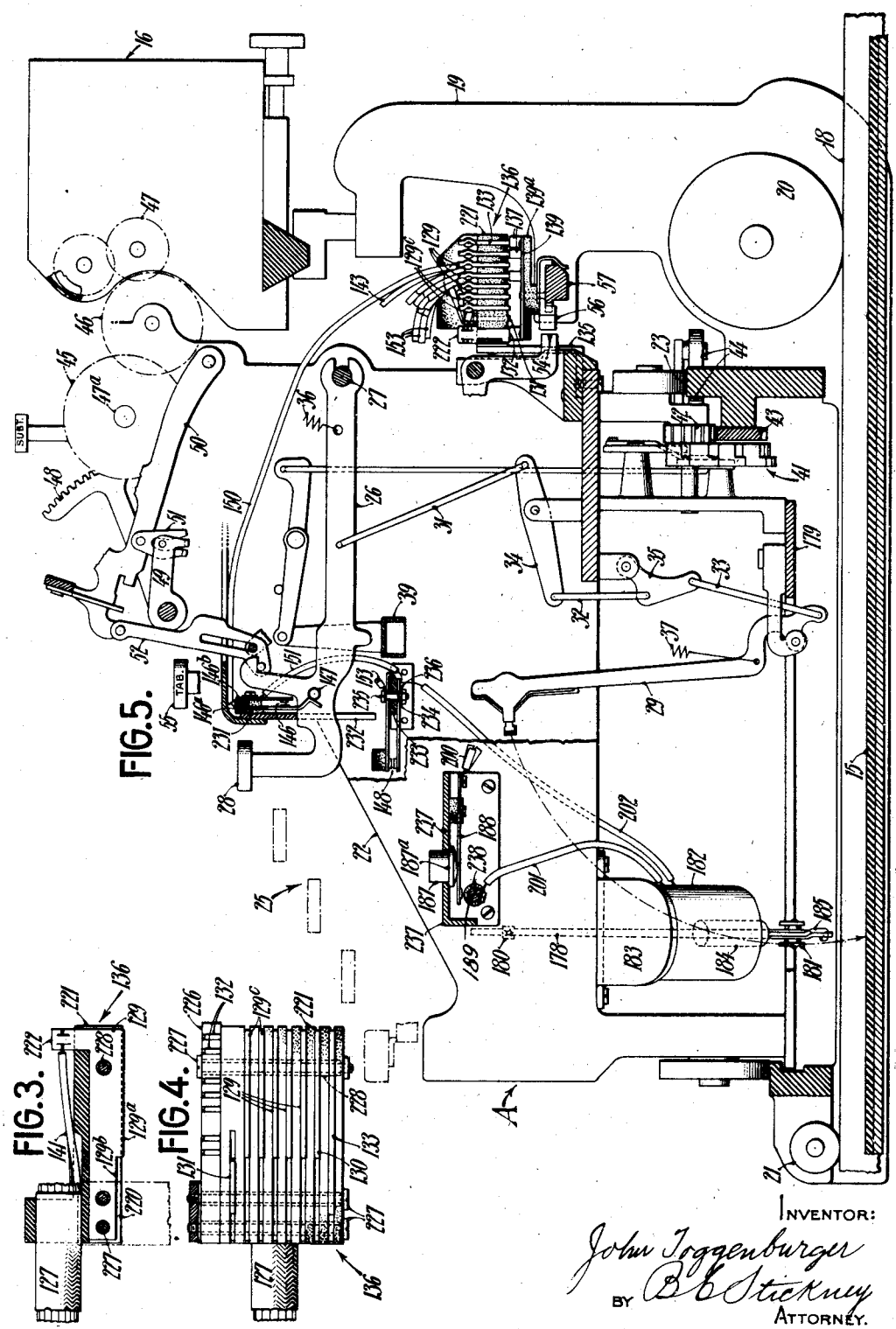

INVENTOR:
John Toggenburger
BY C E Stickney
ATTORNEY.

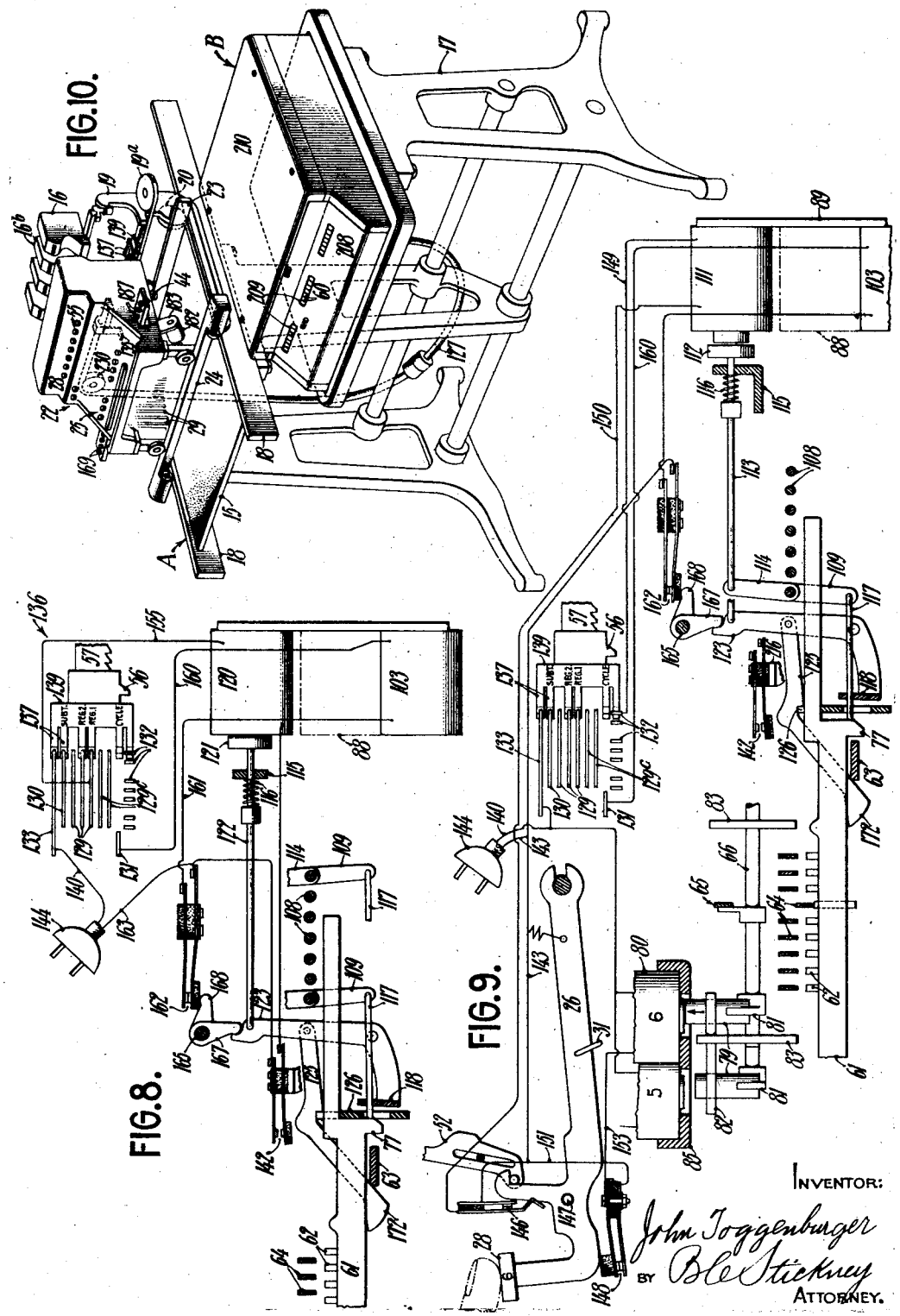

April 2, 1940.                J. TOGGENBURGER                2,195,606
                COMBINED TYPEWRITING AND COMPUTING MACHINE
                      Filed Oct. 25, 1933          6 Sheets-Sheet 6

INVENTOR:
John Toggenburger
BY D.C. Stickney
ATTORNEY.

Patented Apr. 2, 1940

2,195,606

UNITED STATES PATENT OFFICE 2,195,606

COMBINED TYPEWRITING AND
COMPUTING MACHINE

John Toggenburger, Bogota, N. J., assignor to
Underwood Elliott Fisher Company, New York,
N. Y., a corporation of Delaware Application October 25, 1933, Serial No. 695,081

6 Claims. (Cl. 235—60)

In the Thieme application 680,036 filed July 12, 1933, a traveling platen-carriage of a stationary typewriter carries vertical totalizers past a master-wheel driven by indexing trains which include the typewriter-numeral-keys, and, below the stationary typewriter, cross-adders and individual groups of indexable drivers therefor are spaced crosswise of the machine, and any indexing train may directly index, under denomination-selecting and cross-adder-selecting control of the same traveling platen-carriage, any group or any combination of groups of drivers for said cross-adders which perform cross-adding extensively permutable with the vertical-adding operations; the cross-adders being cycled after the indexing operations.

One of the aims of this invention is to provide an organization whereby machines of the Elliott-Fisher (traveling keyboard) class may perform vertical-adding and cross-adding of the same extensive scope as is achieved by Thieme.

The position of the Elliott-Fisher traveling typing mechanism, with reference to any computing zone of the underlying stationary platen, must differentially determine for the zone the selection of one or more of the cross-adders; further, the numeral-keys of the traveling keyboard must, in conjunction with the letter-feeding movements of said typing mechanism through the zone, index, in denominational order, the group of drivers for each selected cross-adder; and mechanism must be provided for cycling the indexed drivers.

To solve these and other phases of the problem with a minimum of change in the organization of the Elliott-Fisher or similar traveling keyboard machine, and with minimum complexity in the cross-adding organization, the invention preferably employs an auxiliary cross-adding unit which may be stationarily mounted in proximity to the book-typewriter, preferably at the side thereof on a common stand. Said unit may be along the lines of the cross-adding portion of the Thieme organization.

Connections designed to permit free movement of the traveling Elliott-Fisher typewriting mechanism, and to enable said traveling mechanism to control the stationary cross-adder unit, are preferably in the form of flexible wires.

A novel organization of electromagnets and contact devices is complemented by said wires to form selectively energizable circuits which operatively conjoin the traveling typewriter and the stationary cross-adder unit. Upon the entry of the traveling typewriter into a computing zone, predetermined selection of cross-adders for said zone is made through some of said circuits preparatory to performing accounting steps which may be supplemental to the accounting done on the master-wheel-driven vertical totalizer of the typing unit. Others of said circuits come into play to effect selection, in denominational order, of the drivers of each selected cross-adder as the typewriter traverses the computing zone upon operation of the numeral-typing keys, which, by means of still other circuits for actuating digit-pin-setting members, index the proper cross-adder drivers, each of which has a complement of digit-pins, by reason of such cross-adder and denomination selections.

At the end of a computing zone, another circuit may be employed to trip cycling mechanism associated with the general operator, and thereby cause the drivers to transfer their indexed values to the selected cross-adders.

Other circuits control the printing of a clear sign, to the end that such sign may be printed for any cross-adder only when the latter is cleared.

By means of a state-controlling circuit, a selected cross-adder may be caused to accumulate an amount subtractively.

The digit-pins for each cross-adder are normally offset from alignment with the corresponding aforesaid type-key-operated digit-pin-setting members, so that denomination-selection may be effected by slightly advancing one driver of any group at a time to align its digit-pins with said digit-members. Cross-adder selection may be a result of the denomination-selection in that, as has heretofore been usual, only the members of a group of drivers for a selected cross-adder are advanced denominationally to align their pins with said type-key-operated digit-members, the drivers for the unselected cross-adder remaining in normal position with their pins offset from, and therefore unsettable by, said digit-members.

In order that there need be but one set of denomination-selecting electromagnets and circuits therefor, capable of serving all the groups of cross-adder drivers, it is contrived to combine with such one set of magnets a set of denominational shafts extending crosswise of all the groups of drivers. The denomination-selecting electromagnets or solenoids, one for each denomination, may be disposed so that their armatures or plungers may operate their respective cross-shafts by simple connections.

Associated with each group of indexable drivers is a shifter which serves to bring a set of couplers into and out of operative alignment with the group of drivers, there being one set of couplers for each driver-group, and said couplers when in operative alignment with said drivers serving to couple the latter to corresponding denominational cross-shafts. Normally the indexable drivers and couplers are out of operative alignment, and the displacement of a shifter to align its drivers and couplers constitutes selection of the associated cross-adder, since the aforesaid denominational cross-shafts and denomination-selecting magnets will then be enabled to effect denomination-selection for indexing of the drivers.

For electromagnetically-controlled cross-adder selection, there is provided for each shifter therefore an operating circuit, including a solenoid and the necessary contact devices. Certain features relating to the relative dispositions of each group of cross-adder drivers, the shifter, the couplers, and the denominational cross-shafts for all the drivers may be, for example, along the lines set forth in the co-pending application No. 472,610, of Pitman, filed August 2, 1930, it being contrived to operate the cross-shafts and cross-adder-selecting shifters by electromagnets under control of the typing mechanism. Associated with the shifters are novel latches and circuit-breaking devices, whereby a cross-adder-selecting magnet, as soon as it has actuated its shifter, is relieved of maintaining the shifter in effective position while the typing mechanism is operated in a computing zone. The latches are arranged so that the shifters and circuit-breaking devices are restored upon cycling of the general operator.

Another feature of invention relates to controlling the cycle-tripping circuit, to the end that the general operator will not be cycled repeatedly under certain conditions.

Since certain circuits such as those relating to cross-adder selection, denomination-selection, subtraction-setting and cycle-tripping are to be controlled, and in some cases variably controlled, with reference to the various computing zones traversed by the traveling typewriting mechanism, each of such circuits presents a contact, the several contacts being grouped for compactness in proximity to one another and traversing as a group, or being traversed by an array of circuit-selecting fingers as the typewriting mechanism traverses a computing zone.

There is an individual array of such fingers for each zone, each array including one or more cross-adder-selecting fingers and also including a finger acting as a denomination-selector. For automatic cycle-tripping, automatic subtraction-setting and other similar zone-controlled operations, corresponding other fingers may be included in the array for any zone.

In the illustrated machine, it is preferably the aforesaid group of contacts that moves with the traveling typewriting mechanism, the several arrays of fingers being non-traveling, or, in other words, being transversely stationary. Any array of fingers by engaging corresponding contacts at a computing zone renders the circuits selected thereby either immediately or potentially effective, depending, respectively, on the non-inclusion or inclusion of other normally open contact devices in any of the magnet-controlling circuits. All the fingers of an array are connected to one side of a current-supply line, and preferably by means of an additional finger, included in said array, which engages an additional contact in the aforesaid group, said additional contact being wired to said supply-line side.

The several fingers of any array may be embodied in a simple unit which may be variably located in accordance with the location of a computing zone traversed in the travel of the typing mechanism. Thus there will be one such finger-unit for each zone, and each unit may also include a tabulating stop, so that both the setting of such stop for a zone and the location of the appropriate array of fingers for said zone are accomplished simultaneously.

In order that certain magnets, such as the denomination-selecting magnets, may not be operated unnecessarily, as, for example, when the typing mechanism is moved through a computing zone otherwise than by operation of the numeral-typing keys, it is contrived to associate with each numeral-typing key, in addition to the contact device for closing the digit-indexing circuit, a normally open contact device which is closed to energize the denomination-selecting circuit in suitably timed precedence to the closing of the digit-indexing contact device in the operation of a numeral-key. Thus, even though the several denomination-selecting circuits are relatively traversed by the denomination-selecting finger in any movement of the typing mechanism through a computing zone, they will not be energized except by operation of the numeral-typing keys.

Other features and advantages will hereinafter appear.

In the accompanying drawings:

Figures 3 and 4 are respectively front elevation and bottom plan views of a novel contact block employed on the book-typewriter for variably controlling the operations of the cross-adder unit.

Figure 5 is a partly sectioned side view of the book-typewriter, the section showing the interior of the machine, to illustrate the circuit distributing and selecting means associated with operation of the cross-adder unit.

Figure 7:
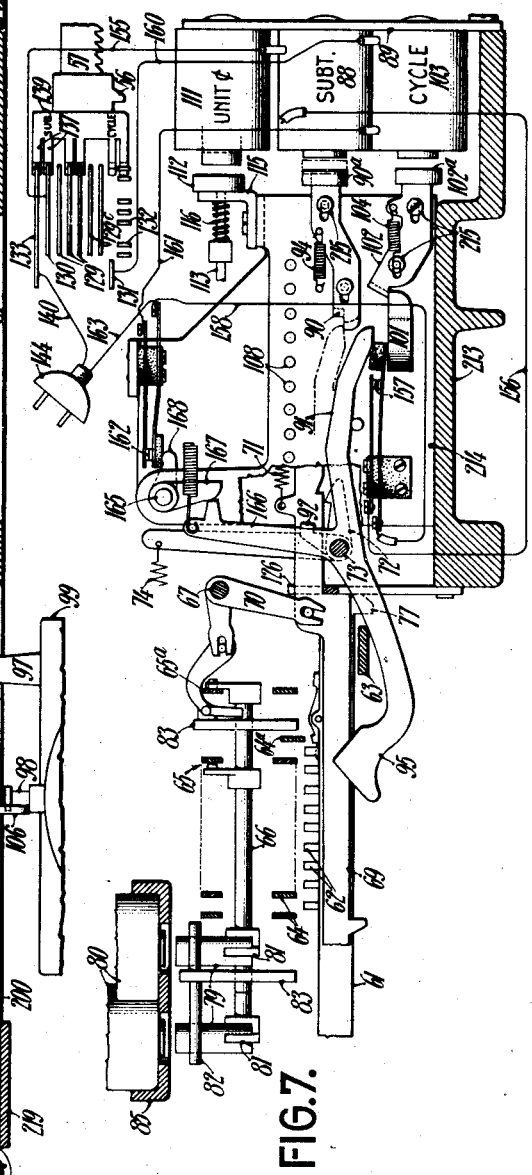

Figure 7 includes a sectional side elevation of part of the cross-adder unit, and also a circuit-diagram to illustrate electromagnetic control of a subtraction-setter.

Figure 8 is a diagram, illustrating the operation of certain parts of the cross-adder unit as controlled by the contact devices of the book-typewriter to select a cross-adder.

Figure 9 is a diagram, illustrating how the depression of a numeral-key, in co-operation with the contact devices of the book-typewriter, actuates certain parts in the cross-adder unit, to index the digit-value in a driver for the selected cross-adder.

Figure 10 is a perspective view, illustrating how the cross-adder unit may be mounted with the co-operating book-typewriter on a common supporting stand.

Figure 11:
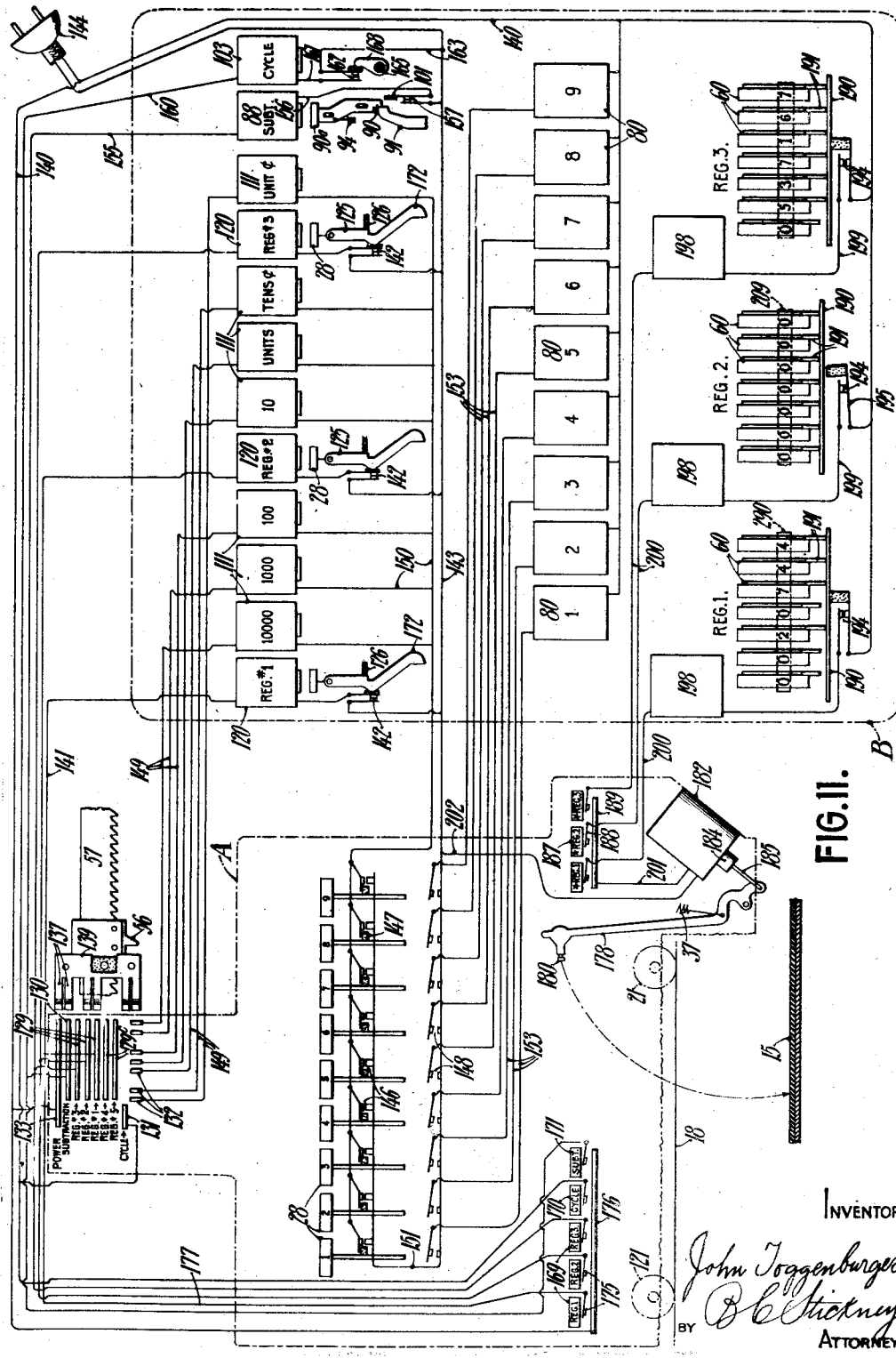

Figure 11 is a circuit-diagram for the entire machine, the parts of said machine related to the various circuits being indicated diagrammatically.

A typewriting mechanism, such as the Elliott-Fisher which includes a stationary platen 15 and master-wheel-operated totalizer 16, is generally indicated in Figure 10 by the reference letter A, and an auxiliary cross-adder mechanism is generally indicated by the reference letter B, said mechanisms being mounted upon a common supporting stand 17.

Figure 1:
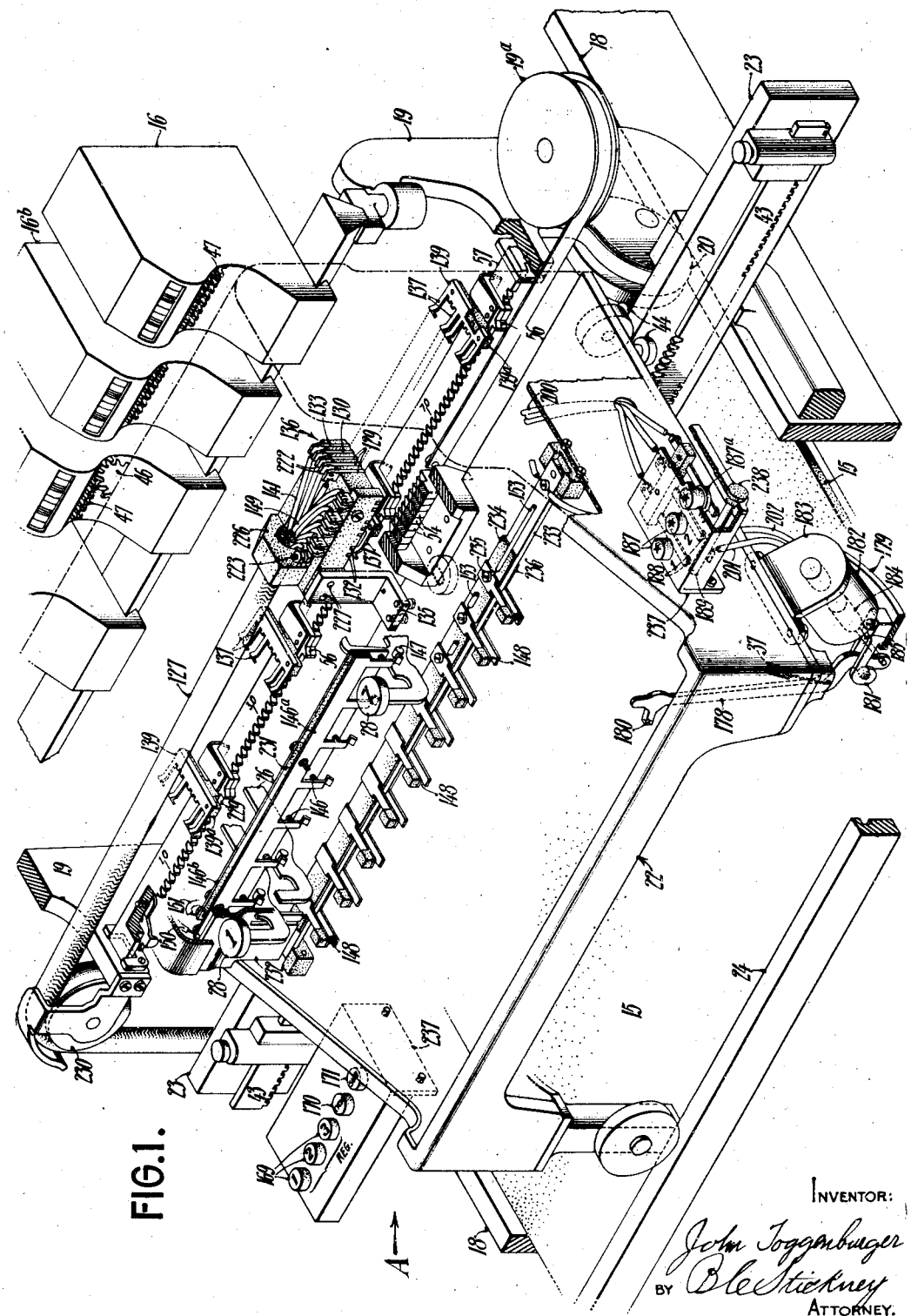
Figure 1 is a perspective view of a book-typewriter of the Elliott-Fisher class, showing the arrangement therein of various electrically-operating controls for the indexing and distributing of totalizing operations in auxiliary cross-totalizers.

There are only shown such parts of the Elliott-Fisher mechanism, Figures 1 and 5, as are necessary for an understanding of the invention. Tracks 18 at the sides of the stationary platen guide the typing instrumentalities in line-spacing direction. The typewriting mechanism, with the exception of said stationary platen, is mounted in a frame 19 having rollers 20 and 21 riding on said tracks 18. A subordinate frame 22 movable transversely on cross-tracks 23 and 24, presented by the frame 19, mounts the type-actions and certain master-wheel mechanism for crosswise movement such as letter-feeding.

In Figure 5, 25 represents the traveling keyboard of the typewriting mechanism, said keyboard including numeral-key levers 26 swingable about a fulcrum-rod 27 upon depression of numeral-keys 28 to drive numeral-type bars 29 toward the stationary platen 15, to print at a common printing point; the several type-bars 29 being arranged in the usual arcuate array. The usual connections from each key-lever 26 to the corresponding type-bar 29 include links 31, 32 and 33, and sub-levers 34 and 35 arranged as shown, restoration of the parts upon release of the depressed key-lever being effected by springs 36, 37.

At operation of any key-lever 26, a universal bar 39, Figure 5, actuates escapement-mechanism 41, such for example as shown in Patent No. 1,203,519, to Foothorap, of October 31, 1916. Said escapement-mechanism co-operates with a letter-feeding pinion 42 and rack 43, to advance the frame 22, which carries all the type-actions, in a letter-feeding step under the pull of a spring-motor 19ª.

Rollers 44 on frame 22 engage the rail 23 to restrain said frame against fore-and-after displacement relative to the frame 19.

The totalizers 16 are locatable transversely of the frame 19, there being one of said totalizers 16 for each computing zone of the stationary platen 15 in which it is desired to perform vertical totalizing.

Any suitable master-wheel mechanism operable conjointly with operation of the numeral-type keys 28 will serve to illustrate the invention, and such mechanism, as for example that shown in Patent No. 1,576,960, to Foothorap, of March 16, 1926, is therefore represented diagrammatically. Said master-wheel mechanism includes a master-wheel 46 mounted by, and traveling transversely with, the frame 22, so as to engage numeral-wheels 47 of any vertical totalizer 16 in denominational order. The master-wheel 46 is rotated according to the digit-value of any operated numeral-key lever 26, which accordingly drives the master-wheel 46 through an individual train which includes a gear-sector 48, said sector receiving an angular master-wheel driving displacement according to said value. The key-lever 26 operates the sector 48 through linkage which includes levers 49 and 50 connected by a link 51, the relative distances from the respective fulcrums of said levers 49 and 50, at which the link 51 is connected, determining the angular displacement of the sector 48 as effected through a link 52 which connects said key-lever 26 to the lever 50. 45 represents a reversible connection, for subtraction, between the master-wheel 46 and a sector-driven shaft 47ª.

Denominational tabulating stops 54, mounted in the crosswise movable frame 22, are operated selectively by corresponding tabulating keys 55, Figure 10, also mounted in said frame 22, to project any stop 54 rearwardly into the path of a counter-stop 56, settable along a removable notched bar 57 presented by the main frame 19. Connections between the tabulating keys 55 and stops 54 and related carriage-release mechanism may be of any suitable form, as, for example, the connections shown in Patent 1,280,697, to Foothorap, of October 8, 1918.

Description of the mechanism of the cross-adder unit B which is to be operatively conjoined with the typewriting mechanism A will be introduced in such part now as will prepare for understanding of the means to be described later for conjoining said mechanisms A and B.

Figure 2:
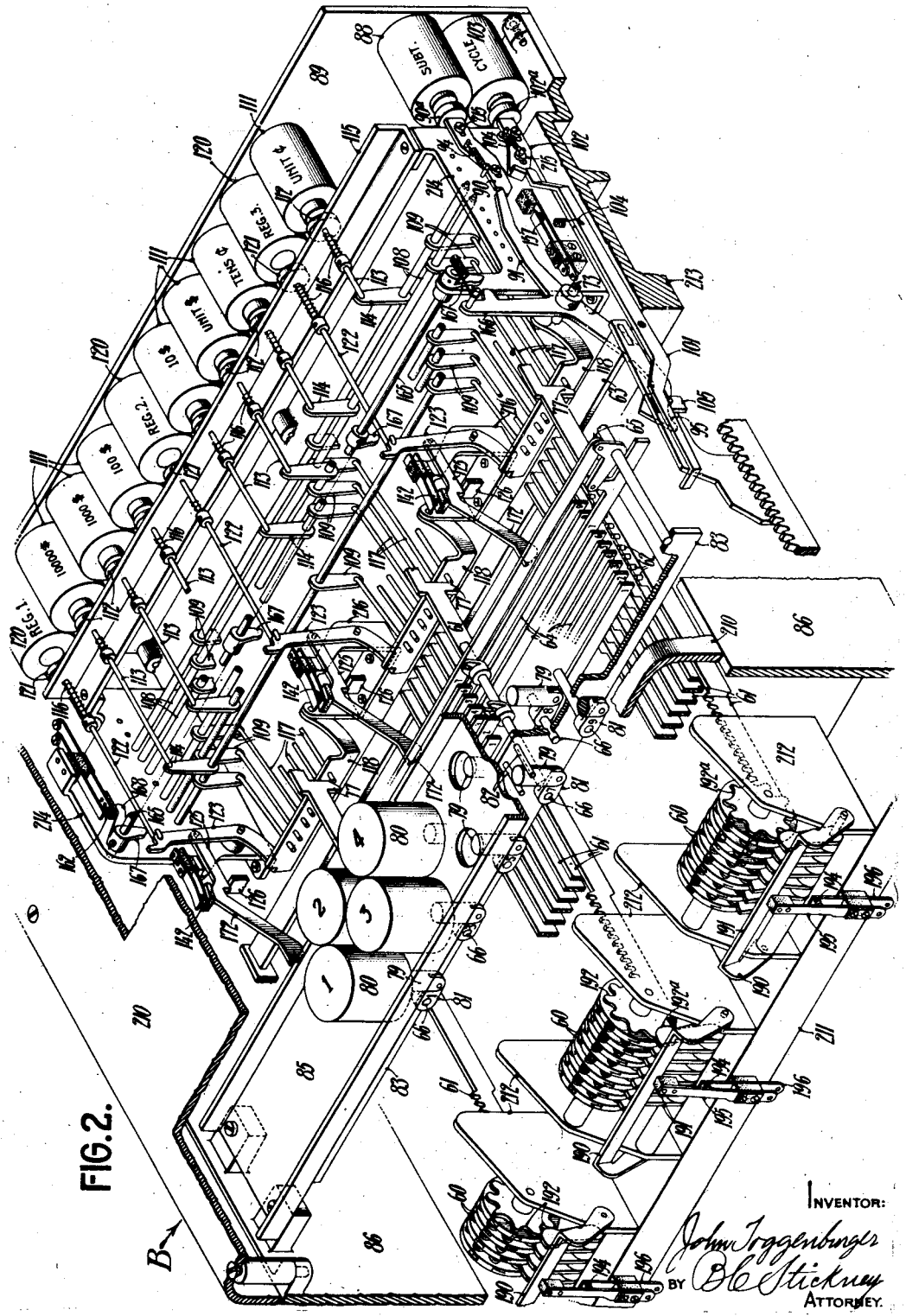
Figure 2 is a perspective view of the computing unit embodying the cross-adders, and shows the electrically operated devices for controlling the same.
Figure 6:
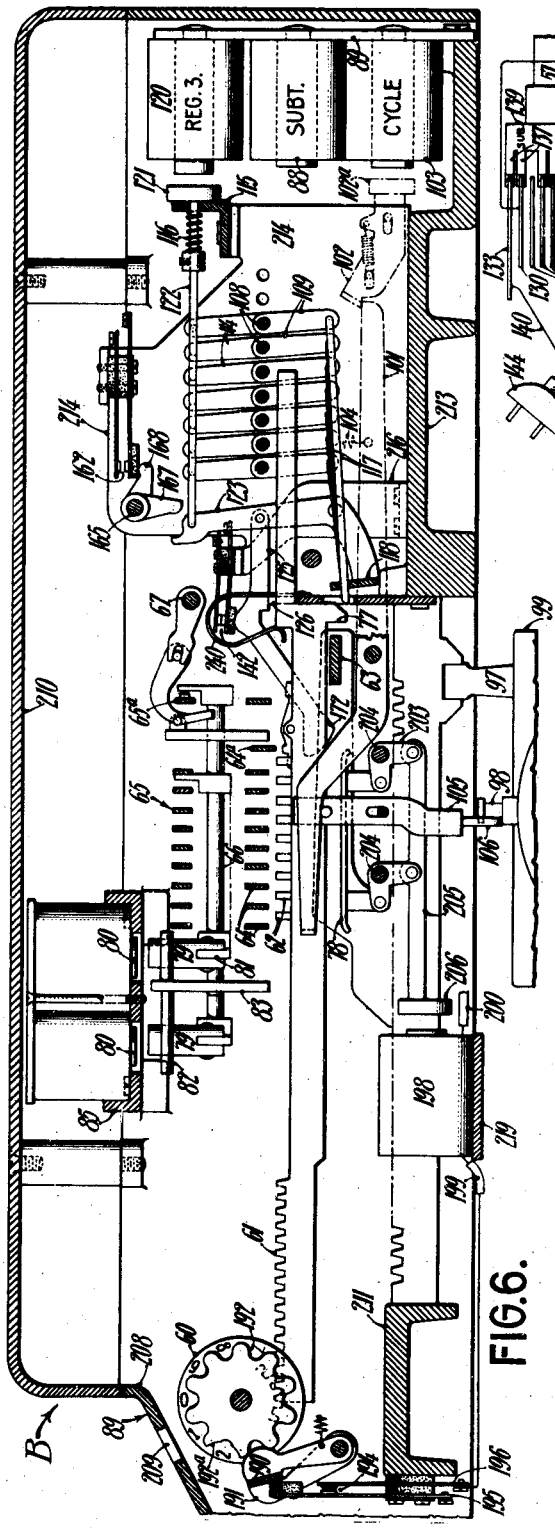
Figure 6 is a sectional side elevation of the cross-adder unit, illustrating the electromagnetically-operated means employed for associating said unit with the book-typewriter.

Referring to Figures 2 and 6, each of the plurality of sets of cross-adder wheels 60 has a corresponding group of drivers or rack-bars 61, carrying each a set of digit-pins 62 individually depressible by an indexing operation, into the path of a general-operator cross-bar 63, which, when cycled after the indexing of an amount is completed, advances the indexed bars 61 to accumulate said amount in the wheels 60, as seen in the round-platen machine of the French Patent 726,799.

Extending transversely of the several groups of drivers 61 is a set of digit or pin-setting members 64. Each member 64 is part of a parallel-motion linkage 65, so that it may be moved up and down in parallelism. For actuating the digit-setting linkages 65 individually, there is a series of digit rock-shafts 66, each extending transversely of the linkages 65, as also set forth in said French patent.

To provide for complementary indexing for subtraction, an additional linkage 65ª is provided and also an additional indexing digit-member 64ª. Preparatory to subtractive indexing, the digit-member 64ª is depressed to set all the "9" digit-pins 62; and the rock-shafts 66 are shifted forwardly, so that, instead of actuating the pin-setting linkages 65 corresponding to the values of said rock-shafts as in addition, they will actuate the linkages of complementary value. The mechanism generally described so far with reference to subtraction-setting is along the lines of the computing mechanism set forth in Patent No. 1,280,065, to Minton, of September 24, 1918, said patent also illustrating the operation of linkages 65 for addition and subtraction and also the functions of parts similar to 64ª and 65ª.

Briefly described, therefore, subtraction-setting of the indexing mechanism is effected by rocking a shaft 67, connected as seen in Figures 6 and 7, to move the digit rock-shafts 66 forwardly upon release of a subtraction-setter 69, connected to said rock-shaft 67 by an arm 70. A spring 71 constantly urges the subtraction-setter 69 rearwardly, the latter being normally restrained by a latch 72 keyed to a latch-withdrawing shaft 73 urged counterclockwise by a spring 74. Figure 7 indicates the latch 72 withdrawn so that the subtraction-setter 69 has escaped and thereby effected movement of the digit rock-shafts 66 and certain other parts to subtractive positions.

Upon cycling of the general operator to advance the subtractively indexed drivers, the subtraction-setter 69 is restored and relatched, to thereby restore the indexing mechanism to its normal additive condition.

The cycling of the general operator 63 also effects restoration of whatever pins 62 were set, such restoration taking place during the return movement of the drivers as effected by the general operator, in its rearward movement, engaging a shoulder 77 of each driver. As the general operator 63 in its return movement brings the drivers with their pins 62 over a restoring plate 78, the latter is caused to be raised to restore the set pins. There may be an individual plate 78 for each group of drivers 61, the operation of the several plates by the general operator being substantially as set forth in Patent No. 1,382,286, to Hart, of June 21, 1921.

For the purpose of the invention, the digit rock-shafts 66 are actuated by electromagnets. Each rock-shaft therefore is connected to an armature or plunger 79 attractable by an electromagnet 80. The lower end of each plunger may be connected to an arm 81 of each rock-shaft. The plungers 79 may move along with the rock-shafts 66 in accordance with the endwise shift of the latter for addition and subtraction setting. The upper end of each plunger may therefore be guided between studs 82 projecting from one of a pair of plates 83, in which the rock-shafts are journaled and which form part of a frame for the pin-setting linkages 65. The several digit-indexing magnets or solenoids 80 may be mounted upon a platform 85 supported by the framework 86 of the cross-adder unit.

The conditioning of the indexing mechanism for subtraction is also to be under electromagnetic control, and, for this purpose, the computing unit B includes a subtraction-magnet 88 which may be mounted upon a plate 89 at the rear of said unit B. The subtraction-magnet 88 upon being energized attracts a latch-member 90 rearwardly, to thereby release a spring-pressed lever 91 loosely fulcrumed upon the aforesaid shaft 73 to which latter is fastened the latch 72 for the subtraction-setter 69. The released lever 91 is enabled, through an abutting arm 92, fastened to said shaft 73, to rotate the latter for releasing the subtraction-setter 69. Upon the cycling of the general operator 63, the lever 91 is restored, thereby causing the latch 90, under the pull of a latch-spring 94, to re-engage said lever 91. The lever 91 is, for that purpose, provided with an arm 95 which is cammed downward at the forward movement of the general operator 63.

The general operator may be cycled by a power-drive such as shown in said Hart patent and which is diagrammatically represented in Figure 6 by the showing of a reciprocatory member 97 connected to the general operator and connectible to an electric motor (not shown) upon raising of a clutch-pin 98 which is part of a clutch-mechanism represented by its casing 99. The cycle is tripped or initiated by raising said clutch-pin through linkage which may be similar to that shown in said Hart patent. Said linkage includes a spring-pressed lever 101 normally restrained by a latch 102 which may be withdrawn or tripped by a cycling magnet 103, also mounted on the plate 89. Upon the attraction of the latch 102 by the magnet 103, the lever 101, released to the pull of its spring 104, depresses a slide 105, which, through a cross-lever 106, withdraws the clutch-pin 98, whereupon the general operator 63 is cycled.

Figure 6 shows the normal positions of the drivers 61, and, in said normal positions, the digit-pins 62 are not aligned with the digit-pin-setting members 64. Before a digit-pin-setting member 64 is operated by its magnet 80, the driver 61 in which a pin is to be set is therefore slightly advanced to align its pins with the digit-pin-setting members 64. In each group, the drivers 61 are advanced to pin-setting position, one after the other.

Selection of any set of cross-adder wheels 60 is effected by determining that the corresponding group of drivers 61 shall be advanced in denominational order to pin-setting position. Such cross-adder selection and the advancing of the drivers 61 to pin-setting position are also to be controlled electromagnetically. In order that there need be but one set of denomination-selecting magnets capable of serving any or all of the several groups of drivers 61, there is employed a set of denominational cross-shafts 108.

For each driver of the same denomination in the several groups, each cross-shaft has an arm 109 fastened thereto. For each cross-shaft 108, there is also an operating solenoid or magnet 111. The several magnets 111, one for each denomination as indicated in Figure 2, by unit ¢, tens ¢, unit $, etc., are mounted on the plate 89. Each magnet 111 has an armature or plunger 112 having a forwardly extending link or stem 113 connected to an arm 114 of the corresponding cross-shaft 108. The rear ends of the stems 113 may be slidably supported in a bar 115, which, as illustrated in Figure 7, forms a stop for limiting the forward movement of the armatures 112. Each train, including a cross-shaft 108, the several arms thereon, and the stem 113, is urged to normal position, determined by abutment of the armature 112 with the bar 115, by a spring 116.

In accordance with the explained method of selecting the set or sets of cross-adder wheels 60; namely, by indexing the drivers 61 for said set or sets, means are provided whereby the cross-shafts 108 may be selectively coupled to any group or groups of drivers 61. Each driver-advancing arm 109 of each cross-shaft 108 is accordingly provided with a coupler in the form of a forwardly reaching link 117, the links 117 being grouped according to the grouping of the arms 109 for each driver-group, as will be seen in Figure 2. The forward ends of said links or couplers 117 are normally out of operative alignment with the drivers 61 which said couplers are intended to operatively connect to the cross-shafts 108. For moving each group of couplers 117 into and out of operative alignment with the drivers 61, the forward ends of said couplers 117 are controlled by a bail or shifter 118. Figure 6 indicates the shifter 118 in such position that the couplers 117, that is, their forward ends, are out of operative alignment with the drivers 61.

The shift of any coupler 117 to effective position, or, in other words, the selection of a set of cross-adder wheels, is also effected by electromagnetically operated means. There is accordingly associated with each shifter 118 a cross-adder-selecting magnet 120. The several cross-adder-selecting magnets may be also mounted on the rear plate 89, and may be interspersed, as indicated in Figure 2, with the denomination-selecting magnets 111. Associated with each cross-adder-selecting magnet 120 are an armature and forwardly-reaching stem 121 and 122. The forward end of each register-selecting stem 122 operates the corresponding shifter 118 through an upwardly-reaching arm 123 of the latter.

For a purpose which will hereinafter appear, each cross-adder selector or shifter 118 is latched when it has been moved to effective position, and, to this end, there is pivoted to the arm 123 of each shifter a forwardly reaching latch 125, which, upon the movement of the shifter 118 to effective position, drops behind a catch afforded by the upper edge of a plate 126, which, as seen in Figure 6, also serves to guide the rear ends of the drivers 61.

Other features of the auxiliary cross-adder unit B will be described in connection with the control of said unit B by the typewriting unit A.

It will be evident that as the typing mechanism, encompassed by the frame 22, travels crosswise of the stationary platen 15, several computing zones may be traversed. As the typing mechanism enters a computing zone, one or more of the cross-adders in unit B may be selected to accumulate the amount typed in said zone. The typing mechanism may be caused to enter a zone, as by operation of one of the tabulating keys 55 which serve to locate the typing mechanism at the proper denomination for typing the first figure of an amount.

The appropriate cross-adders having been selected by the entry of the typing mechanism into said zone, the typing of the amount figure by figure and the corresponding indexing thereof in the drivers 61 of the selected cross-adders may begin immediately upon release of the operated tabulating key 55, the drivers 61 of each group associated with a selected cross-adder to be indexed in denominational order, according to the letter-feeding movements of the typing mechanism through the computing zone.

In order that the typing unit A may control the cross-adder-selecting magnets 120, the denomination determining magnets 111 and the digit-indexing magnets 80 of the auxiliary unit B, the typing unit a includes contact devices, some operative by the key-levers 26 and others operative by the crosswise movement of the typing mechanism, said contacts being supplemented by certain other contacts included in the cross-adder unit B, all the contacts co-operating in one way or another to complete circuits, and thereby energize the several kinds of magnets for controlling the unit B. The portions of the circuits which extend between the mechanism A and the mechanism B are in the form of flexible wires compacted into a cable 127, Figure 10, said cable being arranged to permit free movement of the typing mechanism, forwardly and rearwardly, and crosswise of the stationary platen 15.

Since operation of the circuits for the cross-adder-selecting magnets, the denomination-selecting magnets, the subtraction-setting magnet, and the cycle-tripping magnet, is related to the traverse of a computing zone by the typing mechanism, each of these last-mentioned circuits presents a contact for connection to one side of the power-line in accordance, as may be required, with the entry of the typing mechanism into a zone and its passage therethrough.

Referring to Figure 11, the circuit for each cross-adder-selecting magnet 120 presents a contact 129. These contacts 129 are coxetensive with a computing zone, so that, no matter to which denomination the typing mechanism is tabulated for a zone, co-operating fingers, to be described, will make contact with said contacts 129. A similar contact 130 is presented by the circuit for the subtraction-setting magnet 88. The circuit for the cycle-tripping magnet 103 presents a contact 131. Each circuit for a denomination-selecting magnet 111 presents a contact 132, the several contacts 132 being spaced in the direction of carriage travel, since they are to be engaged in denominational order. An additional contact 133 is connected to one side of the power-line.

All the contacts 129 to 133, inclusive, may be incorporated in a unit or contact block 136 such as represented in detail in Figures 3 and 4, which will be described later. A bracket 135, Figure 5, mounts said contact block 136 so that it may move with the typing mechanism in frame 22 crosswise of the platen and in a path skirting the bar 57 on which the tabulating counterstops 56 are located, the several contact surfaces facing said bar.

Upon the entry of the typing mechanism into a computing zone, a stationary array of fingers 137, which is located according to the computing zone, is engaged by specific ones of the contacts 129 to 133 as required for said zone. Thus, referring to Figure 8, in which it is assumed that the typing mechanism has been tabulated to the highest denomination of a computing zone and in which zone it is desired to effect subtraction and to select cross-adders 1 and 2 of the unit B, the array of fingers 137 for said zone includes a finger to be engaged by the subtraction contact 130, and two other fingers to be engaged by those contacts 129 related to the circuits for selecting registers 1 and 2.

In any array of fingers 137, there will invariably be included a finger for engaging the power-line contact 133, and a denomination-selecting finger for engaging the contacts 132. For automatic cycle-tripping, there would also be included a finger to engage the cycle contact 131.

Since it is usual to set a tabulating counterstop 56 for each computing zone, it is contrived to, at the same time, set an appropriate array of circuit-selecting fingers 137. Said fingers may be in the form of prongs projecting laterally from a plate 139 which may be secured to, but insulated from, the tabulating counterstop 56 which by its location on the bar 57 determines the zone location.

Upon the entrance of the typing mechanism into a computing zone, the cross-adder-selecting magnets 120 for said zone are immediately energized. Thus, referring to Figure 11, the energized circuit for selected cross-adder or register No. 1, for example, would be through a lead 140 from one side of the power-line to the power-line contact 133 and the finger 137 in contact therewith, and by way of the finger-plate 139 to the contact 129 for register No. 1; thence by a lead 141 to the magnet 120 for cross-adder No. 1, and from the magnet, through a normally closed contact device 142, to a lead 143, which connects to the other side of the power-line or current-supply source represented by a plug 144.

From the previous description of the cross-adder unit B, it will be remembered that energization of a cross-adder-selecting magnet 120 causes the cross-adder-selecting shifter 118 to be raised and latched in effective position by means of the latch 125 which drops into effective position behind the plate 126. The normally closed contact device 142 may be operatively connected to the latch as shown so that upon the dropping of said latch to effective position, said contact device 142 is opened, as indicated in Figures 8 and 9. This breaks the circuit of the corresponding register-selecting magnet, which, having done its work, need not remain energized during subsequent travel of the typing mechanism through the computing zone.

Referring to Figure 8, it will be seen that although one of the denomination-selecting contacts 132 has engaged its finger 137, the driver or rack-bar 61 has not been advanced to bring its pins 62 under the pin-setting members 64. In other words, the denomination-selecting circuit is not completed by such engagement of contact 132 and its finger alone. This is for the purpose of avoiding actuating the denomination-selecting magnets 111 by the mere passage of the typing mechanism through a computing zone, that is, without accompanying operation of the numeral-key levers 26. There is associated therefore with the numeral-key levers 26 a contact mechanism, normally open, but which completes the circuit to the selected denomination-selecting magnet, at the initial portion of the down stroke of any numeral-key lever 26.

To this end, there is preferably an individual pair of contacts 146 for each numeral-key lever 26 to effect such completion of the denomination-selecting circuit. As indicated in Figure 5, a projection 147 on each numeral-key lever 26 keeps its contacts 146 open when the key-lever is in normal position, said contacts being, for this purpose, arranged as shown. The contact device 146 being closed and the driver 61 of the appropriate denomination having been as a result thereby advanced to pin-setting position, before the numeral-key lever 26 reaches the end of its down stroke, the key-lever, in so reaching said end of the down stroke, may close another pair of contacts 148 to energize the digit-selecting magnet 80 related to the digit-setting member 64 of corresponding value, to thereby depress the latter and set the proper digit-pin 62. Thus the contacts 146 also serve to complete the denomination-selecting circuit in properly timed precedence to energization of a digit-selecting magnet 80 in order that advance of a pin-bar to indexing position may precede descent of a pin-setting member 64 upon operation of a typing lever 26.

Referring to Figure 9, the denomination-selecting circuit, as first partially closed by the denomination-selecting contact 132 and its finger 137 and then completely closed by the key-lever-controlled contacts 146, may be traced as follows. From the power-line lead 140 to the power-line contact 133 and the finger 137 in contact therewith, and therefore through the finger-plate 139, to the denominational contact 132; thence through the denominational selecting magnet 111, by way of a lead 149, and from said magnet through another lead 150, to one of the now closed contacts 146, and by way of another lead 151 from the other of said contacts 146, to the other side 143 of the power-supply 144, said power-line side 143 being shown in Figure 9 as being tapped into said lead 151.

The digit-indexing circuit energized at the bottom of the down stroke of any numeral-key lever 26, as in Figure 9, may be traced as follows. The power-line lead 143, 151 to the closed digit contacts 148, and thence by way of a lead 153 to the corresponding digit-indexing magnet 80 and from the latter to the other side 140 of the power-line.

Upon release of the depressed numeral-key lever 26, the closed digit-indexing contacts 148 are first opened, and the pin-setting linkage 64, 65 and shaft 66 urged by the usual spring, not shown, are thereby, as a result, returned to normal position; the typing mechanism at about this time also escaping to the next denomination, whereat another key-operation and indexing of the next driver 61 may take place, it being noted that the contact 132 for said next denomination will have advanced into contact with the denomination-selecting finger 137 at such escape. As seen in the several diagrams, the denomination-contacts 132 may be spaced according to the punctuation-spaces obtaining on the work-sheet.

In case it is desired to have the selected registers compute subtractively in a computing zone, there will be included in the plate 139, which presents the array of fingers 137 for said zone, a finger to be engaged by the subtraction-setting contact 130. Thus, upon the entry of the typing mechanism A into such zone, the subtraction-magnet 88 of the cross-adder unit B will be immediately energized for the purpose of releasing the subtraction-setter 69, as indicated in Figure 7.

Referring to Figure 7, the subtraction-setting circuit may be traced as follows. From the power-line lead 140 to the power-line contact 133 and the finger 137 in contact therewith, and hence through the finger-plate 139, in which is included the subtraction-finger, to the subtraction-contact 130. From the subtraction-contact a lead 155 goes to the subtraction-magnet 88. From the subtraction-magnet another lead 156 goes to one of a pair of normally closed contacts 157, a lead 158, 163 from the other of said contacts going back to the other side of the power-line. The pair of contacts 157 serve to break the just described subtraction-magnet circuit after the subtraction-magnet 88 has done its work in releasing the lever 91 by attracting the latch 90 which carries an armature 90ᵃ. As indicated in Figure 7, said contacts 157 are arranged relatively to said lever 91, so as to be opened upon the release of the latter, and may therefore be operatively connected to said lever 91 as shown. When the general operator 63 is cycled, the resulting restoration and relatching of the lever 91 will obviously permit the contacts 157 to be closed again.

Upon typing the last digit of an amount, the typing mechanism contained in the frame 22 takes the usual letter-feeding step, and the general operator 63 of the unit B may then be cycled to accumulate the amounts indexed in the drivers 61 of the selected cross-adders in said unit B. The cycling mechanism of the unit B may be tripped by energizing the cycling magnet 103, and such energization may be accomplished automatically by including in the array of fingers 137 presented by the finger-plate 139 a finger to be engaged by the cycling contact 131.

It may be observed in Figure 11 that said cycling contact 131 is so located as to engage its finger 137 when the typing mechanism has taken the aforesaid letter-feeding step occurring upon the typing of the last digit. The cycling magnet 103 will thereby be energized to attract the latch 102, which carries an armature 102ᵃ, and thereby trip the cycling mechanism as previously described. Referring to Figure 7, the cycle-tripping circuit may be traced as follows. Through the power-line lead 140 and contact 133 to the finger-plate 139, which includes the indicated cycling finger 137, and from said finger, assuming the same to be engaged by the cycling contact 131, through said contact and a lead 160 therefrom to the cycling magnet 103. From the cycling magnet a lead 161 goes to one of a pair of normally open contacts 162, said contacts, however, being closed, as will presently be described, before the typing mechanism has reached the end of a computing zone. Through the closed contacts 162, the circuit continues by way of the lead 163 to the other side of the power-supply line.

The contacts 162 are employed in the cycle-tripping circuit for the purpose of preventing repetition of a cycle should the typing mechanism A be halted with the cycling contact 131 in engagement with its finger. To this end, there extends crosswise of the arms 123 of the several cross-adder-selecting shifters 118 a contact-controlling rock-shaft 165, said shaft also reaching to an arm 166 of the releasable subtraction-lever 91. Said rock-shaft 165 has fastened thereto arms 167, one for each of the arms 123 and 166, so that any one of said arms may rock the shaft 165 to close the cycle-circuit contacts 162 by means of an arm 168 also fastened to said rock-shaft 165. Upon the cycling of the general operator 63 which results from energization of the cycling magnet 103, the subtraction-lever 91 is restored and relatched as previously explained, and the operated shifters 118 urged by the springs 116 are also restored by reason of the shifter-latches 125 being lifted from the plate 126 behind which they dropped, each latch having an extension 172 in the path of the general operator 63 so that it will be lifted by advance of the latter. Upon such restoration and consequent recession of the arms 123, 166, it will be obvious that said arms and hence the rock-shaft 165 no longer maintain the cycle-circuit contacts 162 closed. Therefore, even though the cycle contact 131 may still be in contact with its finger 137, there will be but one cycle of the machine, since a repetition of the cycle would require either immediate selection of another cross-adder or immediate release of the lever 91, either of the latter conditions, however, being avoided by having the register-selecting and subtraction-setting contacts 129 and 130 out of contact with their respective fingers when the cycle contact 131 engages its finger.

To the end that automatict control of cross-adder selection, subtraction-setting and cycle-tripping may be supplemented by manual control, as, for example, when a finger-plate 139 for any zone lacks a certain finger 137, and it is desired in said zone on certain occasions to effect the control which the lacking finger would provide, there may be provided supplemental keys, preferably mounted at one side of the typing-machine keyboard. There may be a key 169 for each cross-adder or register 1, 2 or 3 of the computing unit B for selecting said cross-adder manually, a key 170 for cycle-tripping, and a key 171 for subtraction-setting. Each of these keys when operated presses a contact 175 against a conductor-bar 176 common to all the keys and connected to the power-line lead 140. The contacts 175, however, are connected individually to the respective magnets which they are intended to energize upon depression of the corresponding manual key.

Thus, referring to Figure 11, the manual key 169 for selecting cross-adder or register No. 1 has its contact 175 connected by a lead 177 to the lead 141 which goes to the magnet 120 for selecting register No. 1. From said magnet the circuit extends through the normally closed previously described contacts 142, and thence to one side 143 of the power-line, the other side 140 of the power-line being connected to the common conductor 176 so that pressing the contact thereagainst completes the circuit for energizing the magnet for selecting register No. 1. Each of the contacts 175 for the other manual keys is similarly wired for energizing its respective magnet. The latch 125 also serves, like in Figure 8, to maintain the register-selection effected by means of the manual key 169, so that the latter need be depressed only momentarily for enabling the register-selecting magnet 120 to do its work; it being remembered, further, that in a subsequent cycle the general-operator cross-bar 63 engages the arm 172 of said latch 125 to trip the latter for eliminating the register-selection.

In conjunction with the use of any set of the cross-adder wheels 60, it is desirable to print a clear sign to indicate that said set of wheels 60 was properly cleared preparatory to accumulation of amounts therein, or that a total has been properly transcribed as by a total-subtracting typing operation.

To this end, there is provided in the typing mechanism a type-bar 178 which may be mounted on a segment 179, Figures 1 and 5, which mounts the other type-bars. Said type-bar 178 carries a clear-sign type 180 and may be pivoted upon a bracket 181 in the same way as said other type-bars. For the purpose of the invention, the clear-sign type-bar 178 is operated by an electromagnet 182 mounted, as indicated in Figures 1 and 5, upon a support 183 extending from the typing-mechanism frame 22. A plunger 184 of the magnet 182 may be operatively connected to the clear-sign type-bar 178 by a link 185, seen also in Figure 11.

Associated with the several sets of cross-adder wheels 60 in the computing unit B is a set of clear-sign-printing keys 187, one for each set of cross-adder wheels 60. As seen in Figure 1, said clear-sign keys 187 may be mounted at the side of the typing-mechanism keyboard. Each clear-sign key 187 is operable to press a contact 188 against a conductor 189 which spans all the contacts 188. Each key-operated contact 188 is part of a circuit individual to a corresponding set of cross-adder wheels 60, it being contrived to arrange said circuit and combine the same with certain means so that upon pressing the key 187, the clear-sign magnet 182 will only be operated if all the cross-adder wheels 60 in the set stand at zero.

To this end, use may be made of a bail 190 which spans, as seen in Figure 2, a series of spring-pressed detents 191, there being one lever for each wheel 60, and the same co-operating with detent-notches 192 presented by each wheel, there being a detent-notch for each digit-position of the wheel. A notch 192$^a$ corresponds to the zero-position, and is of greater depth than the notches for the other positions. When all the wheels 60 of a set stand at zero, the bail 190, pressed against all the detents, will be somewhat farther rearward than when any wheel 60 stands at any other position than zero, it being obvious that this condition results from the greater depth of the zero-notches 192$^a$.

The two positions of the bail 190 may therefore be utilized to produce corresponding opening and closing of a pair of contacts 194. One of the contacts 194 may be mounted on a spring 195 which may also serve to press the bail 190 against the detents 191, it being evident that said one contact will be against or away from the other contact in accordance with the position of said bail 190, said other contact being mounted on a relatively stationary plate 196. Each pair of contacts is included in the circuit for the clear-sign key 187 associated with the corresponding set of totalizer-wheels 60.

Referring now to Figure 11, the wheels 60 of cross-adder No. 2 are represented as being all in their zero-positions, and, upon pressing the clear-sign key 187 for cross-adder No. 2, the clear-sign type-bar 178 will be operated by the magnet 182 because the contacts 194 associated with register No. 2 are closed. The circuit whereby the clear-sign magnet 182 is thus energized includes, for a purpose to be described presently, another magnet 198, and said circuit may be traced as follows. One side 140 of the power-line is connected to the movable one of the contacts 194, which, closed as seen in Figure 11, connects said power-line side 140 to the magnet 198 by way of a lead 199. From the magnet 198 another lead 200 extends to the contact 188 of the clear-sign key 187 for the set of totalizer-wheels associated with the closed contacts 194, so that the closing of said contact 188 upon the common conductor 189 connects the clear-sign magnet 182 by way of a lead 201. A lead 202 from said magnet 182 goes to the other side 143 of the power-line to complete the circuit. It will be obvious from inspection of Figure 11 that the clear-sign-printing circuits for the other sets of totalizer-wheels 60 are similar to the one just described.

The clear-sign printing may also be done as a precedent to the start of a new series of indexing and accumulating operations, to assure and indicate not only that the register is initially clear, but also to assure that all the pins are initially in restored or normal condition in order that the first-indexed amount will not be computed erroneously. At the operation of the clear-sign key 187 for any of the sets of cross-adder wheels 60, it is desirable therefore to restore any depressed digit-pins 62 associated with such set of wheels. To this end, the clear-sign-printing circuit for each set of cross-adder wheels 60 includes the aforesaid solenoid or magnet 198 to operate the corresponding pin-restoring plate 78. Said plate 78, in order that it may be moved up and down in parallelism, is connected to spaced bell-cranks 203, said bell-cranks being pivoted loosely on cross-shafts 204. One of the shafts 204 has plate-raising arms (not shown) and is operable by the general operator substantially as shown in the aforesaid Hart patent, all the plates being raised upon such operation of said one cross-shaft 204. The plates 78 may also be individually raised since the bell-cranks 203 are loose on the cross-shafts 204, each pair of bell-cranks being connected by a link 205.

As seen in Figure 6, the link 205 may have a plunger or armature 206 attractable by the pin-restoring magnet 198, it being evident that upon energization of said magnet 198 by operation of the clear-sign key 187, the armature or plunger 206 will be drawn forwardly, the plate 78 being as a result raised and whatever pins 62 were set being restored.

In the illustrated cross-adder unit B, the framework 86 of said unit includes side members which form part of the casing. A forward part 208 of said casing has sight-openings 209 through which the digit-figures on the several sets of cross-adder wheels 60 are visible. The casing may include a top cover 210 secured as shown. The several sets of cross-adder wheels 60 may be mounted between plates 212 rising from a front cross-member 211 of the framework. Rising from a rear cross-member 213 of the framework are side plates 214 in which the denominational cross-shafts 108 may be journaled as indicated in Figure 2. The right-side plate 214 may have studs 215 slidably supporting the latches 90 and 102 associated respectively with the subtraction and cycling magnets 88 and 103.

The single-cycle contacts 162 may be arranged as seen in Figure 2 and mounted on the left-side plate 214; and the rock-shaft 165 which controls said contacts 162 may be journaled in both side plates 214. The circuit-breaking contacts 157 associated with the subtraction-magnet 88 and controlled by the lever 91 may be arranged as seen in Figure 2 and mounted upon the right-side plate 214. The circuit-breaking contacts 142 associated with each register-selecting shifter-latch 125 may in the case of the first cross-adder to the left be mounted on the left-side plate 214, and in the case of each of the other two cross-adders they may be mounted upon a bracket 216 rising from the rear cross-member 213.

As seen in Figure 2, the outer arms of the outer bails or shifters 118 may be pivoted on the side plates 214, all other arms of the several shifters 118 being pivoted on the brackets 216 which may be arranged accordingly as indicated in Figure 2. As shown, the cross-bar 115 which supports the rear ends of the stems 113, 122, may be supported by the plates 214; the magnet-supporting plate 89 may be secured to the rear cross-member 213; and the pin-restoring magnets 198 may be supported upon a cross-member 219 of the framework.

Referring now to the typing mechanism A, details of the contact block 136 are seen in Figures 3 and 4. Each of the contacts 129 and 130 may be formed as indicated in Figure 3, so as to fit in slots 220 of a contact block 221 and to project above said block as at 222, Figure 3, for the attachment of wires such as 141 leading thereto. The power-line contact 133 is similarly fitted in the contact block 221. The cycle contact 131 may also fit in a slot of the contact block and may project through the upper part of the contact block 221 in the form of a threaded stem 223, Figure 1, for attachment to the latter of the lead-wire 160.

The denomination-contacts 132 may be plates formed as indicated in Figure 5 and fitted in a slotted bar 226 of insulating material, the slots facing the front of the contact block 221, as indicated in Figures 4 and 5, each contact 132 projecting above the top of said bar for the attachment of the wire 149 leading to appropriate denomination-magnet 111. The contact block 221, the bar 226 and the several contacts 129 to 133 may be clamped together by screws 227, each surrounded by an insulated bushing 228. The contact surfaces of the contacts 129, 130, 131 and 133 are to be made of appropriate length as indicated for example at 129ᵃ for a contact 129, the contact surfaces being defined as by jogging the contacts as at 129ᵇ, Figure 3.

All the wires that lead from the contacts in the contact block 136 are included in the cable 127 which operatively connects the typing mechanism A and the auxiliary unit B. Said cable also includes other wires extending from the mechanism A to the unit B, such as the wire 200 from each clear-sign-key contact 188, the wires 153 from the digit-selecting contacts 148 and all other wires indicated in Figure 11 as extending between the typing mechanism A and cross-adder unit B. One end of the cable 127 is secured, as indicated in Figure 1, to the contact block 136 and extends horizontally from the contact block to drop downwardly from a point at the side of said frame 19, the latter having a sheave 230 over which the cable drops and over which it runs as the typing mechanism travels crosswise.

The tabulating counterstops 56 and the arrangement thereof for locating of the same upon the stop-locating cross-bar 57 may be similar to the stops shown in the aforesaid Foothorap Patent No. 1,280,697. The finger-plate 139 which is to be operated in a zone corresponding to a counterstop 56 may be fastened upon the top of the latter, but insulated from the stop, the body of which may be extended as at 229, Figure 1, for attachment of the plate 139 and insulation piece 139ᵃ as indicated. It will be observed, see Figure 1, that there may be a plurality of such finger-plates 139, each finger-plate 139 serving a different computing zone and presenting an array of fingers 137 arranged according to the computive operations to be effected in the zone.

Referring to the key-operated denomination-circuit contacts 146, Figures 1 and 5, and also referring to the diagram at Figure 11, it will be noted that the like contacts of the several pairs are connected together. Thus, as indicated in Figure 1, all the forward ones of the contacts 146 are members of a crosswise extending bar 146ᵃ and similarly the rear ones of said contacts are members of a crosswise extending bar 146ᵇ, said bars being insulated one from the other by an insulator 231 and being mounted as indicated in Figures 1 and 5 upon a comb-plate 232 for the key-levers.

The digit-selecting contacts 148 are mounted upon a bar 233 supported by and insulated from the frame 22 as indicated in Figure 1. Projecting from said bar 233 are the lower ones of the contacts 148, said lower contacts having a common connection through the bar 233. The upper ones of the contacts 148 rest upon insulation 234 which insulates the upper contacts 148 individually and from the bar 233. Wires 153 leading from upper contacts 148 are attached to the latter by screws 235 which may also serve to clamp together said upper contacts, the underlying insulation 234, the bar 233 and a plate 236 from which the lower contacts project.

The arrangement of the manually-operable contact mechanism which includes the keys 169—170 at the left of the typing-mechanism keyboard is similar to the mechanism for the clear-sign keys 187 and therefore only the latter will be described. A casing 237 is attached to the side of the typing-mechanism frame 22 and is perforated at its top to receive push-buttons which constitute the clear-sign keys 187 as seen in Figure 5. Each push-button or key 187 has at its bottom a flange 187ᵃ which is pressed against the under side of the casing 237 by a contact spring which constitutes the movable contact 188, said contact spring being insulated from the casing 237 as indicated in Figure 5, the key 187 being preferably of insulating material. The common contact 189 associated with the clear-sign contacts 188 may be supported by and between the side walls of the casing 237 and may be insulated therefrom by insulators 238, Figures 1 and 5.

Details of the conjoint operation of the typing mechanism A and the cross-adder unit B will be understood from the preceding description and said operation may therefore be summarized as follows.

For any or each computing zone traversed by operation of the typing mechanism A and in which the cross-adder unit B comes into play, there is provided an array of fingers 137. Figure 1 indicates four such arrays of fingers for four zones in each of which there may also be used a vertical totalizer 16 of the typing mechanism A. It will be obvious that there may be a zone in which only a vertical totalizer such as 16ᵇ. Figure 1, is employed, in which case the array of fingers 137 will be omitted from such zone. Conversely, it will be obvious that there may be zones in which only the auxiliary unit B comes into play.

In letter-feeding or in tabulating from zone to zone the frame 22 moves rightward. In any computing zone the typing mechanism is first positioned to the denomination of the first figure of the amount to be written in said zone, said positioning taking place as by operation of the proper tabulating key 55.

Such positioning of the frame 22 will have also positioned its contact block 136, so that the proper denomination-contact 132 in said block is in contact with its finger 137. Those contacts 129 in said block which correspond to the circuits for the sets of cross-adders which are to be employed in the zone, and for which fingers 137 are provided, will also have made contact with their fingers and the power-line contact 133 will be in contact with its finger.

The fingered contacts 129 will therefore function to energize the proper cross-adder-selecting magnets 120, and cause the corresponding shifters or selectors 118 to be raised and latched, the circuits for the operated magnets 120 being thereupon broken by means of the contacts 142. This raising of the shifters 118 brings their respective sets of couplers 117 into operative alignment with the drivers 61 for the selected sets of cross-adder wheels as indicated in Figure 8.

The amount may now be typed figure by figure and, if desired, entered in a vertical totalizer 16 of the typing mechanism A. Simultaneously with the typing thereof, said amount may also be entered for the selected sets of cross-adder wheels 60 in unit B, the amount, however, not being directly entered into the selected wheels 60, but being indexed in the drivers 61, which in each selected group are advanced to bring their pins 62 to indexing position under the digit-members 64 of unit B, one driver after the other in proper denominational order, as the typing mechanism moves rightward in the letter-feeding steps.

At each letter-feeding step or denomination, the proper denominational contact 132 makes contact with its finger 137, but such contact alone does not energize the corresponding denomination-magnet 111. Said magnet 111 is energized at the beginning of the down stroke of a numeral-key lever 26 by the closing of the contacts 146, whereupon the proper driver 61 in each selected group is advanced to pin-setting position, as indicated in Figure 9, in which it is further shown that the numeral-key lever 26 has completed its down stroke, so that, at the bottom of the key-lever stroke, the digit-selecting contacts 148 are closed to energize the corresponding digit-selecting magnet 80, and thereby depress the digit-member 64 to set the proper pin 62 in the advanced driver 61 of each selected group of drivers. Upon release of the numeral-key lever 26, the contacts 148 are opened, the depressed digit-member 64 being thereby restored, and the denomination-circuit contacts 146 are also opened. The typing mechanism upon said release of the numeral-key takes a letter-feeding step to the next denomination, any drivers 61 previously advanced to pin-setting position being retracted to their Figure 6 position by the usual spring 240, the driver or drivers 61 for said next denomination not being advanced, however, until the next key-lever 26 is operated.

Thus the typing of an amount, figure by figure, the direct entry of each figure into the vertical totalizer 16, if desired, and the corresponding indexing of each figure in the selected groups of cross-adder drivers 61 proceed to the last figure of the amount.

Following the typing of the last figure the typing mechanism takes its usual letter-feeding step, causing the contacts 129 and 132 to pass beyond their respective fingers 137.

If automatic cycle-tripping is practiced for the zone, the cycle-tripping contact 131, as a result of said last letter-feeding step, engages its finger 137, which will have been provided in the plate 139. The cycling magnet 103 is thereby energized to release the cycle-trip lever 101, Figure 6, and thereby raise the clutch-pin 98. This initiates a cycle in which the general operator 63 advances the indexed drivers 61 to drive the selected cross-adder wheels 60, and then returns to return the indexed drivers. The drivers have the usual one-way connection to the totalizer-wheels 60, so as to drive the latter in only one direction of the driver movement.

It will be understood that suitable carry-over mechanism (not specifically shown) is associated with the operation of the cross-adder wheels 60.

Upon the cycling of the general operator, the raised shifters 118 are unlatched and restored, and other parts associated with said shifters are also restored, such as the contacts 142 and 162. The set digit-pins 62 will also have been restored by the cycling of the general operator 63, the pin-restoration being effected by operation of the plates 78 through the medium of the general operator.

Instead of cycle-tripping being effected automatically, upon the typing mechanism taking the letter-feeding step following the typing of the last digit, the cycle-key 170 may be operated, in which case the finger 137 for the cycle-contact 131 may be omitted.

It will be obvious that if the computation in the selected totalizer-wheels 60 is to be subtractive, the array of fingers 137 will include one to be engaged by the subtraction-contact 130. In such case upon the entry of the typing mechanism in a computing zone, the subtraction-magnet 88 will be energized to release the lever 91 and thereby release the subtraction-setter 69, which conditions, as previously explained, the indexing mechanism for complementary subtractive indexing. In the general-operator cycle following the subtractive indexing, the lever 91 is restored by the general operator 63 in its forward stroke, the return stroke restoring the subtraction-setter 69, which, by reason of the restored lever 91, becomes latched again by the latch 72. Restoration of the subtraction-setter restores the indexing mechanism 64, 65, 66 and related parts to additive condition.

It will be evident that more sets of cross-adders or wheels 60 and related parts may be provided than the three sets illustrated in the drawings, or there may be less than three sets. For each additional set there is provided in the contact block 136 a cross-adder set-selecting contact 129c.

Variations may be resorted to within the scope of the invention, and portions of the improvements may be used without others.

Having thus described my invention, I claim:

1. In combination, a typewriter, a computing mechanism including a set of computing wheels, said computing mechanism also including a device controlled by said computing wheels to represent whether or not all of said wheels are clear, a clear-sign printing type in said typewriter, an electromagnet for actuating said clear-sign printing type, a clear-sign type-key, and an operating circuit for said electromagnet controlled in part by said clear-sign type-key and in part by said device whereby said key is effective to energize said magnet to actuate said clear-sign type only when said wheels are clear.

2. The invention defined in claim 1, said computing mechanism including settable index elements, and a restored operable to restore said index elements, and an electromagnet, for actuating said restorer, connected in said circuit to be energized concomitantly with operation of said clear-sign key only when all of said computing-wheels are clear.

3. In combination, a typewriter including digit type-keys, and a carriage controlled thereby, a computing mechanism having digit indexing and denomination-selecting means co-operative with said type-keys and carriage at a computing zone of the latter, said computing mechanism including a trippable cycling mechanism, an electromagnet for tripping said cycling mechanism, means, responsive to the carriage only when the latter is in a computing zone, to become set and thereby partly close an operating circuit for said magnet, a contact device closable by the carriage, as the latter leaves said computing zone, to complete said circuit and thereby trip said cycling mechanism, and a device co-operating with said cycling mechanism to restore said set means to reopen said circuit, whereby to prevent repetition of the cycle even though said carriage may still be in position to close said contact device.

4. In a machine of the class described, the combination of a reciprocatory carriage, a set of register bars, denominational devices operable seriatim by the carriage for selecting the register bars for indexing, said devices and register bars normally being operatively disconnected, means shiftable from a normal inoperative position to operative position to effect operative connection of said denominational devices and register bars, an electromagnet actuatable for shifting said shiftable means to operative position, a circuit adapted to be closed by said carriage to actuate said magnet, and a latch automatically operative to hold said shiftable means in operative position following the actuation of said magnet.

5. In a machine of the class described, the combination of a reciprocatory carriage, a set of register bars, denominational devices operable seriatim by the carriage for selecting the register bars for indexing, said devices and register bars normally being operatively disconnected, means shiftable from a normal inoperative position to operative position to effect operative connection of said denominational devices and register bars, an electromagnet actuatable for shifting said shiftable means to operative position, a circuit adapted to be closed by said carriage to actuate said magnet, a latch automatically operative to hold said shiftable means in operative position following the actuation of said magnet, and a contact device in said circuit and controlled by said latch to break said circuit in response to said latch becoming effective to hold said shiftable means.

6. In a machine of the class described, the combination of a reciprocatory carriage, a set of register bars, denominational devices operable seriatim by the carriage for selecting the register bars for indexing, said devices and register bars normally being operatively disconnected, means shiftable from a normal inoperative position to operative position to effect operative connection of said denominational devices and register bars, an electromagnet actuatable for shifting said shiftable means to operative position, a circuit adapted to be closed by said carriage to actuate said magnet, a latch automatically operative to hold said shiftable means in operative position following the actuation of said magnet, and a general operator mechanism operable to trip said latch preparatory to restoration of said shiftable means to inoperative position.

JOHN TOGGENBURGER.